United States Patent [19]

Jacob et al.

[11] Patent Number: 5,624,318
[45] Date of Patent: Apr. 29, 1997

[54] CONSTANT VELOCITY JOINT WITH A CONNECTING SHAFT

[75] Inventors: Werner Jacob, Frankfurt; Manfred Niederhüfner, Hanau; Jürgen E. Heyne, Saarbrücken, all of Germany

[73] Assignee: Löhr & Broomkamp GmbH, Offenbach am Main, Germany

[21] Appl. No.: 448,838

[22] Filed: May 24, 1995

[30] Foreign Application Priority Data

Jun. 3, 1994 [DE] Germany ............... 44 19 341.6

[51] Int. Cl.$^6$ ..................................... F16D 3/22
[52] U.S. Cl. .................. 464/140; 464/145; 464/167; 464/906
[58] Field of Search ..................... 464/179, 182, 464/178, 140, 141, 139, 167, 168, 906; 403/164, 165

[56] References Cited

U.S. PATENT DOCUMENTS

| | | | |
|---|---|---|---|
| 3,204,429 | 9/1965 | Kayser | 464/141 |
| 3,368,368 | 2/1968 | Breuer et al. | 464/140 |
| 4,012,925 | 3/1977 | Krude | 464/906 X |
| 4,332,005 | 5/1982 | Hirai et al. | 464/145 |
| 4,909,774 | 3/1990 | Müller | 464/906 X |
| 4,950,206 | 8/1990 | Jacob | 464/140 |

FOREIGN PATENT DOCUMENTS 1142641  2/1969  United Kingdom ............... 464/167

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

A constant velocity joint (2) with a connecting shaft (4). The inner part (12) of the constant velocity joint (2) includes a through-bore (28) with a first portion in the form of inner teeth (29) and a second bore portion in the form of a circular-cylindrical bore portion (32). A coupling sleeve is inserted into the inner part (12). The coupling sleeve (33) includes outer teeth (34) which engage the inner teeth (29). These are followed by a circular-cylindrical portion (35) centered in the bore portion (32). The coupling sleeve (33), on its inner face, has first longitudinal grooves (37) arranged opposite second longitudinal grooves (39) of the connecting shaft (4). Rolling-contact members (40) are received between the first and second longitudinal grooves and are held so as to be guided in a cage. Members (40) serve to transmit torque between the coupling sleeve (33) and the connecting shaft (4) and enable a linear adjustment between the coupling sleeve (33) and the connecting shaft (4). By separating the inner part (12) from the coupling sleeve (33), production of the inner part is improved and it is possible to divide the joint function into a plunging movement and angular movement.

6 Claims, 2 Drawing Sheets

CONSTANT VELOCITY JOINT WITH A CONNECTING SHAFT

BACKGROUND OF THE INVENTION

The invention relates to a constant velocity joint with a connecting shaft. The constant velocity joint includes an outer part with a cavity. Outer running grooves extend in the inner face of the outer parts in meridian planes with reference to the longitudinal axis of the outer part. An inner part is pivotably accommodated in the cavity of the outer part. Inner running grooves are formed in the inner part outer face, which form a pair with the respective opposed outer running grooves. The inner running grooves extend in meridian planes with reference to the longitudinal axis of the inner part and serve jointly to accommodate balls for torque transmitting purposes. A cage is arranged between the outer face of the inner part and the inner face of the outer part. The case includes windows to guide the balls. Inner teeth are arranged in a through-bore of the inner part. The through-bore is centered on the longitudinal axis of the inner part. Corresponding outer teeth are on the connecting shaft to non-rotatingly connect the connecting shaft to the inner part. With such an embodiment, the connecting shaft, by means of its outer teeth, is directly positioned in the through-bore of the inner part and is connected thereto by a securing ring. The inner teeth extend over the entire length of the through-bore.

The adjusting movement takes place between the inner part and outer part. It is thus a so-called constant velocity plunging joint which does not only permit the inner part to be articulated relative to the outer part, but it also enables their axial adjustment relative to one another.

U.S. Pat. No. 4,950,206 issued Aug. 21, 1990 discloses a driveshaft wherein two constant velocity joints are connected to one another by a connecting shaft. The inner part of one constant velocity joint is formed onto the one end of the connecting shaft, whereas the other end of the connecting shaft is provided with circumferentially distributed longitudinal grooves. The inner part of the other joint is provided with a projection and includes a through-bore having longitudinal grooves arranged opposite the longitudinal grooves of the connecting shaft. The longitudinal grooves arranged opposite one another in pairs contain rolling contact members in the form of balls arranged one behind the other with reference to the longitudinal axis. The change in length between the two constant velocity joints is effected by changing the depth by which the connecting shaft enters the through-bore of the inner part of the other constant velocity joint.

With such an embodiment, production of the inner part of the other joint by a forming operation is complicated and expensive. This is due to the fact that the inner running grooves of the inner part, which receive the torque transmitting balls arranged between the inner part and outer part of the joint, and the longitudinal grooves in the through-bore of the inner part have to be formed at the same time. A further problem is that the adjustable length to be provided between the connecting shaft and the inner part of the other joint may vary, depending on the specific application, requiring different lengths of the longitudinal grooves in the inner part of the other joint. Depending on the application, it is thus necessary to produce different inner parts, although the joints for example only differ with respect to the adjustable length in the plunging region.

SUMMARY OF THE INVENTION

It is therefore an object of the invention to propose a solution where the inner part of the joint, accommodating the plunging part, is easier to produce and according to which adaptation of the plunging movement to different plunging lengths is simplified.

In accordance with the invention, the objective is achieved by the inner teeth of the inner part forming a first portion of the through-bore, which starts from the end face of the inner part facing the connecting shaft, and which is followed by a circular-cylindrical bore portion constituting the second portion. The outer teeth to connect the connecting shaft to the inner teeth of the inner part are associated with a coupling sleeve which, next to the outer teeth, includes a circular-cylindrical portion by means of which they are received in a centered way in the circular-cylindrical bore portion of the inner part. The coupling sleeve axially projects from the inner part towards the connecting shaft and includes a bearing through-bore. The bore has circumferentially distributed first longitudinal grooves which extend parallel to the longitudinal axis of the inner part. The connecting shaft, in its outer face, has second longitudinal grooves positioned opposite said first longitudinal grooves. The connecting shaft enters the coupling sleeve and is adjustable therein in the direction of the longitudinal axis of the inner part by rolling contact members received in the first and second longitudinal grooves.

The advantage of this embodiment is that the coupling sleeve and the inner part may be produced separately and subsequently joined together. Both the inner part and the coupling sleeve may be produced by a non-chip producing forming operation. There is much less deformation work required than in the case of the prior art solution, and there exists a further advantage in that the coupling sleeve may be designed to meet the plunging length requirements. The length of the coupling sleeve is independent of the production length of the inner part.

The coupling sleeve is preferably secured to the inner part by securing means. Such securing means could be a securing ring, for example, arranged between the coupling sleeve and the inner part. However, the two parts are preferably secured by a weld positioned between the coupling sleeve and the inner part. The weld is preferably produced by a low-heat welding process. Such a process could be laser welding or electron beam welding.

The two sets of teeth, the inner teeth of the inner part and the outer teeth of the coupling sleeve, may be relatively short. Furthermore, advantageous production conditions and a high torque transmitting capacity are achieved by using an involute tooth profile which results in small tooth heights which requires only low deformation forces when carrying out the non-chip producing forming operation.

According to a further embodiment of the invention, the length of the inner teeth and outer teeth is shorter than the length of the circular-cylindrical bore portion of the inner part and of the circular-cylindrical portion of the coupling sleeve by means of which both are centered relative to one another.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

DETAILED DESCRIPTION OF THE DRAWINGS

Figure 1:
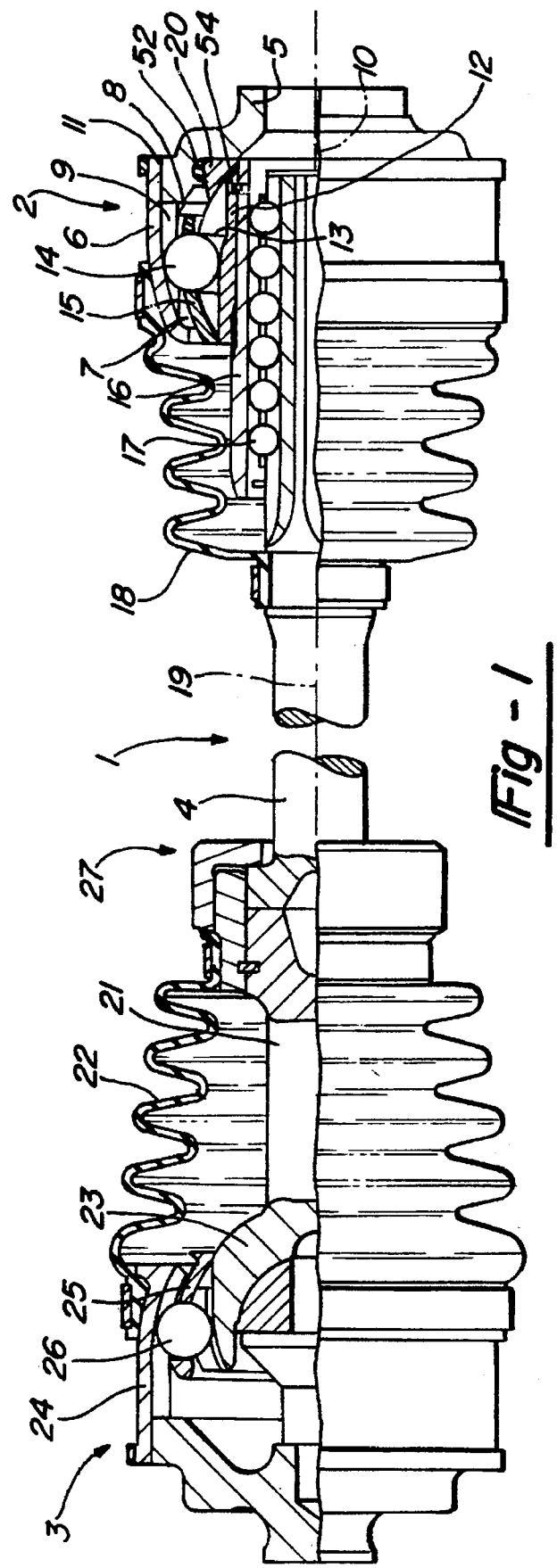
FIG. 1 is a partial cross-sectional view of a jointed shaft wherein, with respect to one of the two constant velocity joints, the connection enabling plunging movement is in accordance with the invention.

FIG. 1 shows the jointed shaft 1 together with a first joint 2, second joint 3, and a connecting shaft 4 connecting the two joints 2, 3.

The joints 2, 3 are of identical design as far as their most important components are concerned. In consequence, the design of the first joint 2 will be explained in greater detail below. The two joints 2, 3, essentially, differ with respect to the connecting means used for the connecting shaft 4.

The first joint 2 has an outer joint part 6 which is hollow and whose cavity has been given the reference number 7. The inner face 8 of the cavity 7 includes circumferentially distributed outer running grooves 9 which extend in meridian planes with reference to the longitudinal axis 10 of the outer part.

The outer part 6 is divided. Apart from the part comprising outer running grooves 9, it includes connecting means 5 which close the joint and serve to provide a connection with the axle differential of a motor vehicle. Both are firmly connected to one another by a weld 11.

The cavity 7 of the outer part 6 accommodates the inner part 12 such that it is pivotable in all directions. The inner part 12, in its outer face, includes inner running grooves 13 which also extend in meridian planes with reference to the longitudinal axis 19 of the inner part. Opposite each inner running groove 13 there is arranged an outer running groove 9. Both, together, accommodate a ball 14 to transmit torque between the outer part 6 and the inner part 12.

In addition, the balls 14 are guided in a cage 15. The cage 15 includes windows 50 which hold the balls 14 and from which the balls 14 project radially inwardly and radially outwardly to be able to engage the respective inner running groove 13 and outer running groove 9. In the present example of a constant velocity joint, the cage 15 is guided by means of a hollow spherical partial face on a spherical outer face of the inner part 12 arranged on the end pointing towards the connecting shaft 4.

Furthermore, the inner part 12, by means of its spherical outer face, is guided on a control element 20. The control element 20 is radially movably guided at the connecting means 5, but held in a recess by a resilient ring 52 which holds the control element 20 in a pre-fitted position relative to the connecting means 5, but enables a radial adjustment. The first joint 2 is designed as a fixed joint, which means that the inner part 12 and the outer part 6 can only carry out angular movements relative to one another.

A coupling means 16 is provided for connecting the inner part 12 to the connecting shaft 4. The coupling means 16 will be described in greater detail with reference to FIGS. 2 and 3. The coupling means 16 includes a plunging part 17, which enables a change in the distance between the two joints 2, 3. The entire assembly is sealed by a convoluted boot 18 against lubricant losses and external influences.

The second constant velocity joint 3 has an inner part 23 which includes an integrally formed journal 21. The inner part 23 is pivotably received in the outer part 24. The outer and inner part include inner running grooves and outer running grooves respectively, holding balls 26 guided by a cage 25. This assembly, too, is covered by a convoluted boot 22. Furthermore, the outer part 24 is associated with connecting means which, for example, serve to provide a non-rotating connection with the wheel flange of a driven wheel of a motor vehicle.

The journal 21 is connected to the connecting shaft 4 by means of a coupling 27. However, the journal 21 may also be integral with the connecting shaft 4.

Figure 3:
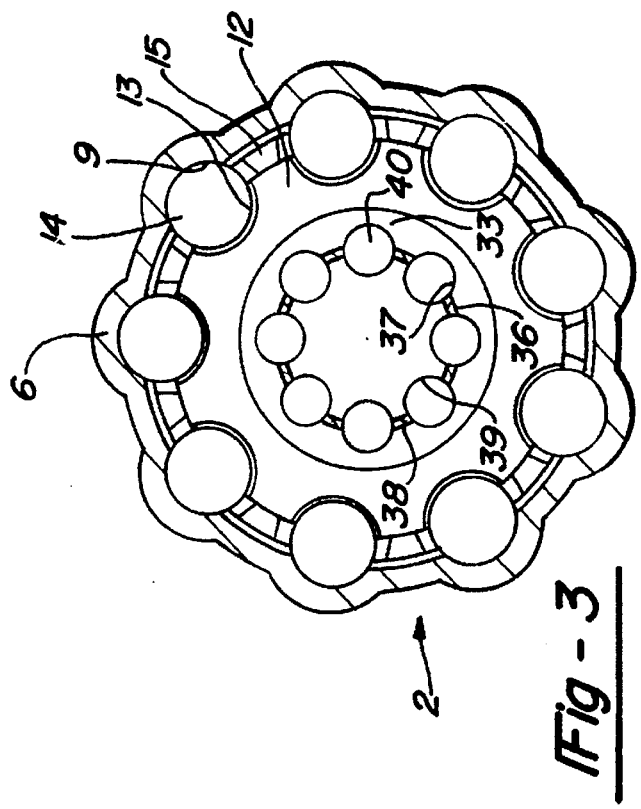
FIG. 3 is a cross-section view along Line 3—3 of FIG. 2.
Figure 2:
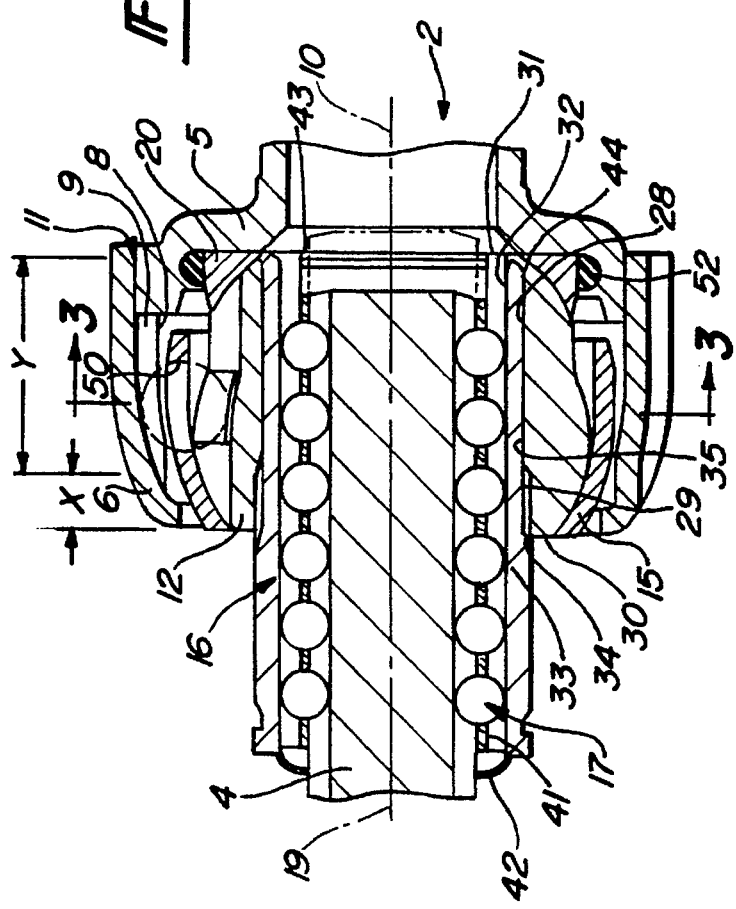
FIG. 2 is an enlarged cross-section detail view of the constant velocity joint and the connecting shaft of FIG. 1.

FIGS. 2 and 3 show the first joint 2 in an enlarged scale. They also show a portion of the connecting shaft 4 and the plunging part 17 associated with the coupling means 16. The first constant velocity joint 2 includes an outer part 6 whose cavity has an inner face 8 with circumferentially distributed outer running grooves 9 extending in meridian planes with reference to the longitudinal axis 10 of the outer part. The inner part 12 is arranged in the cavity 7 so as to be pivotable around the joint center. The inner part 12, in its outer face, includes inner running grooves 13. A torque transmitting ball 14 is associated with two opposed running grooves, an inner running groove 13 and an outer running groove 9.

Between the inner face 8 of the outer part 6 and the outer face of the inner part 12, a cage 15 is guided on the outer face of the inner part 12. To be able to guide the balls 14, the cage 15 has windows 50 through which the balls project radially inwardly and radially outwardly to be able to engage the outer running grooves 9 and the inner running grooves 13. The inner part 12, together with the cage 15, is guided on the one hand by the balls 14 and on the other hand by contact between the spherical outer face of the inner part 12 and the hollow spherical face of the control element 20. The control element 20 is guided at the connecting means 5 of the outer part 6 so as to be radially movable to a limited extent, with resilient means being arranged therebetween.

The inner part 12 includes a through-bore 28 which is centered on the longitudinal axis 19 of the inner part. The inner part 12, starting from end face 30, includes teeth 29 of a short length X, the teeth 29 having an involute profile. From the end of the inner teeth 29 to the other end face 31 of the inner part 12, a through-bore 28 is provided in the form of a circular-cylindrical bore portion 32.

A coupling sleeve 33 which, like the inner teeth 29, constitutes part of the coupling means 16 between the inner part 12 and the connecting shaft 4, is inserted into the through-bore 28. The coupling sleeve 33 includes a portion which projects from the end face 30 and which is followed by a toothed portion provided in the form of outer teeth 34 which also have an involute profile and match the inner teeth 29. Towards the other end of the coupling sleeve 33, the outer teeth 34 are followed by a circular-cylindrical portion 35. The coupling sleeve 33 is inserted into the through-bore 28 of the inner part 12, so that a non-rotating connection is achieved by means of the outer teeth 34 engaging the inner teeth 29. In addition, the coupling sleeve 33 is centered in the circular-cylindrical bore portion 32 of the inner part 12 by means of its cylindrical portion 35.

Furthermore, the coupling sleeve 33 is axially secured to the inner part 12 by means of a welded region or weld 44, FIG. 2, or a retaining ring 54, FIG. 1, provided in the region of the second end face 31. The circular-cylindrical portion 35 and the circular-cylindrical bore portion 32 extend along a length Y which is much greater than the length X of the teeth 29, 34.

The coupling sleeve 33 is axially bored and includes a bearing bore 36, with circumferentially distributed first longitudinally grooves 37 which extend parallel to the longitudinal axis 19 of the inner part arranged in the bearing bore. The connecting shaft 4 is inserted into the bearing bore 36. On one portion, in its outer face 38, the shaft 4 includes second longitudinal grooves 39 extending parallel to the longitudinal axis 19 of the inner part. Each pair of opposed first longitudinal grooves 37 and second longitudinal grooves 39 accommodate balls in the form of rolling contact members 40, with a plurality of balls arranged one behind the other on the longitudinal axis 19 of the inner part.

The balls 40 are held in a cage 41, thus achieving a rolling movement and, in consequence, a plunging part 17 featuring very little friction as a result of the rolling movement. The displacement of the cage 41 relative to the coupling sleeve 33 is limited due to anti-extraction means 42 at the coupling sleeve 33 end facing the connecting shaft 4 and due to a securing ring stop 43 inserted into the coupling sleeve 33 in the region of the end face 31 of the inner part 12, between which two elements 42, 43 the cage 41 is adjustable. If greater movement is required than permitted by the degree of freedom of the rolling movement of the balls 40 held in the cage 41, the connecting shaft 4 may be extracted further from the coupling sleeve 33, but the cage 41 is not adjusted any further. In such a case, there occurs a sliding movement.

While the above detailed description describes the preferred embodiment of the present invention, the invention is susceptible to modification, variation and alteration without deviating from the scope and fair meaning of the subjoined claims.

We claim:

1. A constant velocity joint with a connecting shaft, said constant velocity joint comprising:

an outer part defining a cavity, an outer running grooves extending in an inner face of said outer part, said outer running grooves in meridian planes with reference to the longitudinal axis of the outer part;

an inner part pivotably accommodated in the cavity of the outer part, an outer face on said inner part including inner running grooves which form a pair with respective opposed outer running grooves, said inner running grooves extend in meridian planes with reference to a longitudinal axis of the inner part and serve jointly to accommodate a ball for torque transmitting purposes;

a cage arranged between the outer face of the inner part and the inner face of the outer part, said cage including windows for guiding the balls;

inner teeth formed in a through-bore of the inner part, said through-bore being centered on the longitudinal axis of the inner part, and corresponding outer teeth for non-rotatingly connecting the connecting shaft to the inner part;

said inner teeth of the inner part form a first portion of the through-bore, which starts from an end face of the inner part facing the connecting shaft and which is followed by a circular-cylindrical bore portion constituting the second portion;

said outer teeth for connecting the connecting shaft to the inner teeth of the inner part are associated with a coupling sleeve, said coupling sleeve including a circular-cylindrical portion adjacent said outer teeth, and said coupling sleeve and connecting shaft are received in a centered way, via said sleeve circular-cylindrical portion in the circular-cylindrical bore portion of the inner part;

said coupling sleeve axially projects from the inner part towards the connecting shaft and includes a bearing through-bore with circumferentially distributed first longitudinal grooves which extend parallel to the longitudinal axis of the inner part;

said connecting shaft outer face includes second longitudinal grooves positioned opposite said first longitudinal grooves;

and said connecting shaft enters the coupling sleeve and is adjustable therein in the direction of the longitudinal axis of the inner part by rolling contact members received in the first and second longitudinal grooves.

2. A constant velocity joint according to claim 1, wherein said coupling sleeve is secured to the inner part against axial movement by securing means.

3. A constant velocity joint according to claim 2, wherein said securing means including a securing ring arranged between the coupling sleeve and the inner part.

4. A constant velocity joint according to claim 2, wherein the securing means are provided in the of a weld between the coupling sleeve and the inner part.

5. A constant velocity joint according to claim 1, wherein inner teeth of the inner part and the outer teeth of the coupling sleeve have an involute profile.

6. A constant velocity joint according to claim 1 wherein length of the inner teeth and outer teeth are shorter than length of the circular-cylindrical bore portion of the inner part and of the circular-cylindrical portion of the coupling sleeve.

* * * * *

UNITED STATES PATENT AND TRADEMARK OFFICE
CERTIFICATE OF CORRECTION

PATENT NO. : 5,624,318
DATED : April 29, 1997
INVENTOR(S) : Werner Jacob, Manfred Niederhüfner, Jürgen E. Heyne It is certified that error appears in the above-identified patent and that said Letters Patent is hereby corrected as shown below:

Column 1 of the cover page, under [73] Assignee
"Löhr & Broomkamp GmbH" should be --Löhr & Bromkamp GmbH--

Column 1, line 20, "case" should be --cage--

Column 4, line 68, "longitudinally" should be --longitudinal--

Column 5 line 32, Claim 1, delete "an" (second occurrence)

Column 6, line 37, Claim 4, after "the" (second occurrence), insert --form--

Signed and Sealed this

Twentieth Day of January, 1998

Attest:

Attesting Officer

BRUCE LEHMAN

Commissioner of Patents and Trademarks